July 10, 1962 W. A. OVERKAMP, JR., ET AL 3,044,015

SYSTEM FOR TRANSMITTING A MESSAGE FROM A PROTECTED LOCATION BY RADIO TO A DISTANT RECEIVER

Filed April 28, 1960

INVENTORS
WILLIAM A. OVERKAMP JR.
PAUL H. KRAUS
IRA KLINGENSMITH
BY John H. Bruninga
ATTORNEY 3,044,015

SYSTEM FOR TRANSMITTING A MESSAGE FROM A PROTECTED LOCATION BY RADIO TO A DISTANT RECEIVER

William A. Overkamp, Jr., 4068 Wilmington Ave., St. Louis 16, Mo., and Paul H. Kraus, 4349A Maryland Ave., and Ira Klingensmith, 4346 McPherson Ave., both of St. Louis 8, Mo.

Filed Apr. 28, 1960, Ser. No. 25,344
7 Claims. (Cl. 325—187)

This invention relates to a system for transmitting a message from an enclosed protected location by radio to a distant receiver. In accordance with an embodiment of this invention, a radio transmitter is located at a protected location, and which is provided with a device adapted to produce and deliver a message to the transmitter which is then transmitted by radio to the distant receiver. The distant receiver, in accordance with an embodiment of this invention, is located on a police or squad car, which may cruise in the district of the protected location. The transmitter and the message-producing device are activated by a switch which is closed by someone at the protected location.

It is important that the apparatus be in a protected location so that it cannot be tampered with by a burglar. Accordingly the essential parts of the apparatus are enclosed, viz., in a vault or room whose contents are not accessible.

It is important that the transmission of the message from the protected location to the receiver be as instantaneous as possible; for, if that is not accomplished, the burglar or holdup men may work so fast that before the message is received by the distant receiver, they will have accomplished their purpose and will have left the protected location before the police will have arrived. One of the objects of this invention, therefore, is to accomplish the above named purpose, namely, to attain as soon as possible, and in fact instantaneous, transmission of the message.

A radio transmitter is conveniently operated by an outside source of alternating current, such as a 120 volt, 60 cycle utility power source. If, however, that outside power source is interrupted or should fail in any manner, then, of course, there can be no transmission of a message. Another object of this invention, therefore, is to provide a source of electrical current inside of the protected location and independent of the outside source, together with means for automatically connecting that inside source to the terminals of the outside source within the location upon failure of the outside source.

Other objects of this invention are to provide a system which is simple in its arrangement and construction, and which is certain in its action.

Further objects will appear from the detailed description taken in connection with the accompanying drawings, in which will be described and set forth an embodiment of this invention; it is to be understood, however, that this invention is not to be limited to the embodiment described and shown, except as included within the appended claims.

*General Description*

Figures 1, 2, 3, 4, 5, 6, 7, 8:
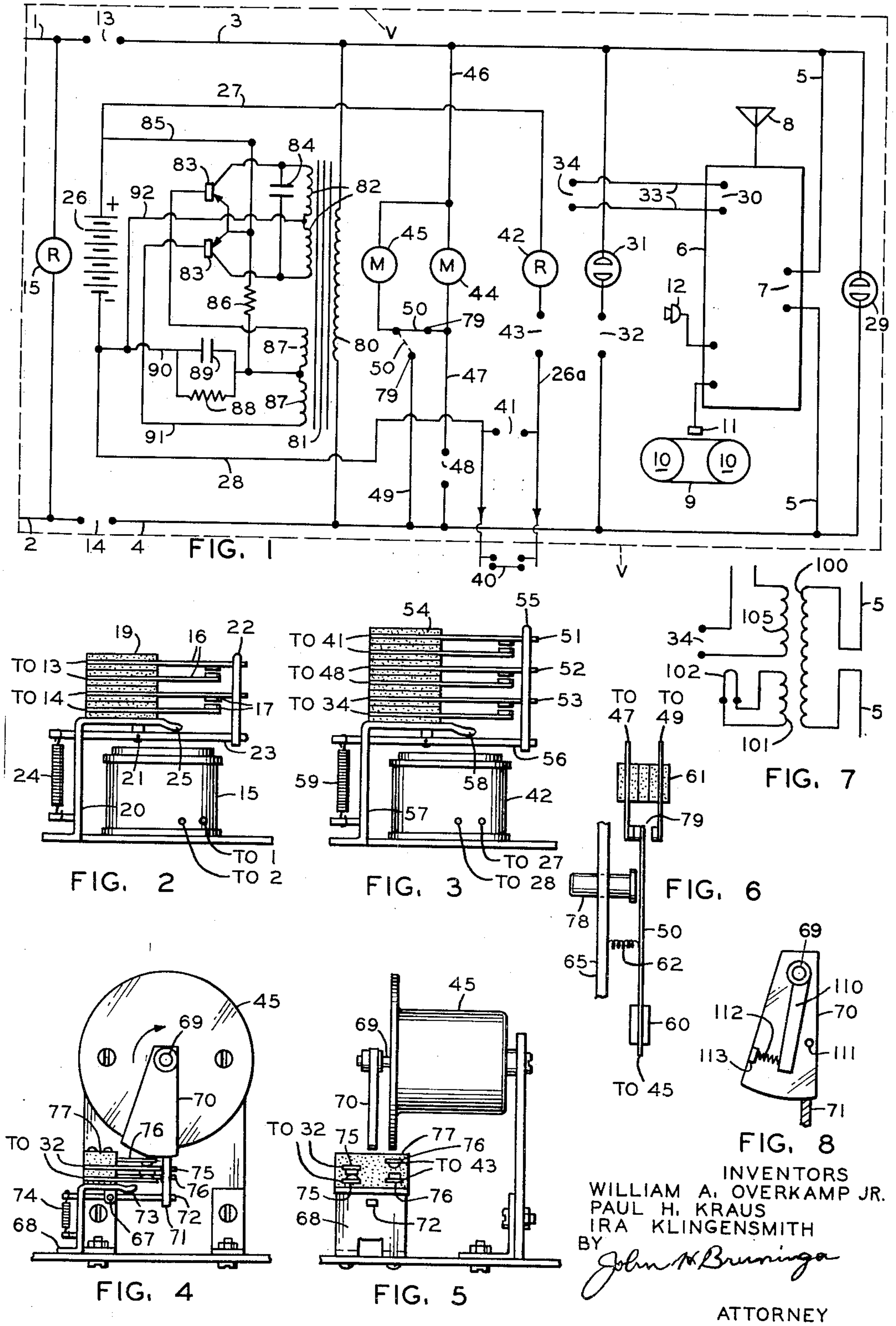
FIG. 1 is a very general diagram of a system embodying this invention.
FIG. 2 is a detail of a relay employed in the system normally connecting the system with the outside source, but operable to connect the system within the protected location.
FIG. 3 is a detail of another relay connected to carry out a sequence of operations.
FIG. 4 is an end view partly in section of a timer for operating switches employed in connection with the relay of FIG. 3 to bring about a sequence of operations.
FIG. 5 is a side view of the timer.
FIG. 6 is a detail partly in section of a resetting switch employed in the system.
FIG. 7 is a diagrammatical view showing circuits in a part of the transmitter.
FIG. 8 is a view of a cam mounting of FIG. 4 showing another embodiment.

Referring to the accompanying drawings, 1 and 2 designate the conductors from the outside source coming into the protected location, in which the essential apparatus is enclosed by an enclosure V shown by construction lines FIG. 1; and 3 and 4 designate conductors which with the conductors 1 and 2 constitute terminals inside of the protected location normally connected to the outside source, but which may be connected to an inside source. Leads 5 from 3 and 4 connect to a transmitter 6, the terminals of which are generally shown at 7. An antenna for the transmitter is shown at 8. A message producing device is generally shown at 9, and that may be in the form of a magnetic tape passing over rollers 10 which are driven from a motor 44 hereafter described. A pickup 11 adjacent the tape is connected to the transmitter so as to deliver the message to the distant receiver. The tape may have a general message such as "Burglary at 410 Seventh Street." It is understood, however, that other forms of message-producing means may be provided such as an automatic phonograph disc, or even a code message delivering device. An ordinary microphone is indicated generally at 12.

The transmitter may be of standard construction being provided as usual with cathode tubes, each having a filament. However, as will be later described, in accordance with an embodiment of this invention, a secondary winding in the transmitter and in inductive relation to a primary winding connected to the source is permanently connected with the filament, so as to keep the cathode tubes warm in order to be prepared for instant sending of the message.

Connected across terminals 13 and 14, inside of the location is a relay 15, generally shown in FIG. 1, and in detail in FIG. 2. The relay is connected to the incoming connections 1 and 2, so that the relay will remain energized as long as the outside source is not interrupted or fails. Cooperating switch contacts 16 are connected to the terminals 13, while cooperating switch contacts 17 are connected to the terminals 14. These switches are mounted in and separated by insulation 19 mounted on a bracket 20 above the relay 15. The upper switch contacts of 16 and 17 extend into and are fixed in a part 22, which is mounted on a ferrous bar 23 pivoted at 21 on the bracket 20, and normally bears against the end 25 of the bracket 20. The end of the bar 23 extending beyond the bracket 20 has a tension spring 24 which normally holds the bar 23 against the stop 25 in order to keep the contacts of 16 and 17 separated. However, upon energizing the relay 15 by current from the outside source, the bar 23 will be moved down so as to close the contacts 16 and 17 to apply the current from the outside source to the conductors 3 and 4 within the protected location. As long, therefore, as the outside source does not fail, current will be applied to the system inside of the location; however, if the outside source is interrupted or fails in any manner, then the supply of outside current to the conductors 3 and 4 will be interrupted. Later will be described means provided to continue such supply of current to the system upon failure of the outside source.

In FIG. 1, relays are generally indicated by R, while motors are generally indicated by M.

Referring to FIG. 1, a storage battery 26, inside of the location has connected thereto conductors 27 and 28. This battery is arranged to supply direct current to a part of the system. A converter hereafter described and receiving alternating current from the outside source supplies a trickle charge to the battery. Upon failure of the outside source, however, the converter operates reversely to cause the battery to supply an alternating current to the entire system.

Connected across the conductors 3 and 4 is an indicating device such as a neon lamp 29, which indicates the active connection of the outside source to the system, also the failure of that source and the connection of the converter to the system upon such failure of the outside source. Another indicating device, which may again be in the form of a neon lamp 31, is connected across the conductors 3 and 4, but has included in its circuit terminal 32 arranged to be closed and opened as hereafter described to indicate that the message is being sent. Terminals 30 to a secondary winding 105 of the transmitter 6 and in inductive relation to a primary 100, FIG. 7, are connected by conductors 33 to terminals 34 which are opened and closed as hereafter described in order to effect sending of the message from the transmitter to the distant receiver; see FIG. 7 later described.

An alarm switch 40, having a movable part as shown and included in the direct current circuits 26, 27 and 28, is supplemented by the terminals of a second switch 41, hereafter described. Included in that direct current circuit is a relay 42 and the terminals of another switch 43, hereafter described. A motor 44 for driving the message tape rolls 10 mechanically (drive not shown), is connected across the conductors 3 and 4 by conductors 46 and 47, including the terminals 48 of a switch hereafter described. Connected in parallel with the motor 44 is a clock motor 45 through a switch 50 when in upper position as hereafter described. This switch 50 when moved to lower dotted position connects with conductor 49 which is connected to the conductor 4.

FIG. 3 shows the construction of the relay 42. Mounted above the relay are switch contacts 51, 52 and 53, each having contacts therebelow as shown, and all of which are mounted in and separated by insulation at 54 on a bracket 57. The contacts of pair 51 connect to the terminals 41; the contacts of 52 connect to terminals 48, and the contacts 53 connect to terminals 34, all as shown in FIG. 1. The upper contacts 51, 52 and 53 are fixed in a part 55, mounted on a ferrous bar 56, pivoted at its middle on a bracket 57 and which bar normally bears against the part 58 of the bracket 57, and is held elevated by a tension spring 59. The terminals of the relay 42 are connected to 27 and 28 leading from the battery through the three terminals 43, 40 and 41. Accordingly, when the relay 42 is energized as hereafter described, the switch contacts 51, 52 and 54 will be closed to close 41, 48 and 34, respectively.

Referring to the clock motor 45, shown generally in FIG. 1 and in detail in FIGS. 4 and 5, this clock motor or timer is of the usual alternating current type provided with gears so that a complete rotation of its time shaft will consume a predetermined period, viz., one minute. The shaft 69 of this motor has a cam 70 arranged to engage a cross-piece 71 mounted on a ferrous bar 72 pivoted at 67 on the bracket 68, arranged to engage against the stop 73 on the bracket 68 and normally forced up by a tension spring 74. A pair of contacts 75 has the upper one passing through and fixed in the cross-piece 71. However, the the lower one of a pair of contacts 76 is extended so as to be fixed in the cross-piece 71. These pairs of contacts are located above one another in an insulation 77. The contacts 75 are connected to the terminals 32 while the contacts 76 are connected with the terminals 43, see FIG. 1. Normally, with the cam out of engagement with the cross-piece 71, the contacts 75 and terminals 32 will be open while the contacts 76 and terminals 43 will be closed. While in FIGS. 1 and 6 the switch contact 50 is shown horizontal and vertical respectively; FIG. 1 is really diagrammatical. When, however, see FIGS. 4 and 5, the cam 70 engages the cross-piece 71, the contacts 75 and terminals 32 will be closed while the contacts 76 and terminals will be open. The cross-piece 71 is omitted in FIG. 5.

A resetting switch 50, generally shown in FIG. 1, but in detail FIG. 6, is actuated by a push button 78. The push button 78, movable in a support 65 below the top of the enclosure V, engages the movable contact 50 fixed at 60 and connected with the lower terminal of the clock motor 45, FIG. 1. The contact 50 is arranged to contact with a pair of contacts 79 leading to the terminals of 47 and 49, respectively, and supported in insulation at 61. A tension spring 62 normally holds the contact 50 against the left contact 79, which corresponds to the upper position of 50 in FIG. 1. When the contact 50 is moved to the right contact 79, that will correspond to the lower position of 50, FIG. 1.

Referring to FIG. 1 connected across the conductors 3 and 4 is the primary winding 80 of a transformer having a ferrous core 81 and in inductive relation with secondary windings 82 in circuit with rectifiers, viz., transistors 83. The system has a condenser 84 across the secondaries 82. The conductor 85 from the positive of the battery 26 connects to a point between the transistors 83 and has a resistance 86 leading to the midpoint of secondaries 87, which are in inductive relation to primary 80, which midpoint has resistance 88 and the condenser 89 in parallel relation and leads by 90 to the negative of the battery 26. A connection 91 leads to the lower transistor 83, while a connection 92 from 90 leads to the midpoint of the transformer secondaries 82. As hereafter described, when the outside source 1, 2 has not been interrupted, a rectified trickle charge will be applied to the battery 26; however, if the outside source fails, an alternating current will be imposed upon the system. The structure of the converter described in this paragraph is not novel per se because it is known. However, the application of the same to this system is novel.

Referring to FIG. 7 in connection with FIG. 1, a transmitter 6 of a well-known construction comprises a primary winding 100 and a secondary winding 101 in inductive relation to the primary winding 100 and applying a low voltage to the filament 102 of a cathode tube and there may be a series of such tubes. Another secondary winding 105 also in inductive relation to the primary winding 100 applies a message to the antenna 8 and for delivery of the message to a distant receiver. Primary 100 is connected by the leads 5 and 6 to the conductors 3 and 4. As hereafter described, the circuit of the secondary winding 105 is normally open. However, the circuit of the secondary winding 101 is kept closed to permanently apply current to the filament 102 so as to keep the cathode warm and ready for instantaneous transmission of the message to the distant station when the circuit of the secondary 105 is closed.

*Operation of the System*

Referring to FIG. 1, the operattion of the system is generally as follows, irrespective of whether alternating current is supplied by an outside source or by the battery and the converter inside of the protected location. The lamp 29 is permanently connected across the conductors 3 and 4 of the system and indicates whether current is being supplied, because it will remain lit as long as that takes place; even if the outside source of current should fail, the connection of the inside source will be practically instantaneous. A message will have been applied to the message-producing means, tape 9, ready to be picked up by the pickup 11 and sent into the transmitter 6. At that time, a low voltage current will always be permanently applied to the filament or filaments 102, FIG. 7, of the cathode tube or tubes so as to always keep the cathodes warm. The terminals 34 will, however, be open, so that the secondary 105, FIG. 7, will be open. At that time, the terminals of 32 in the circuit of the lamp 31 will be open so that the lamp 31 will not show as lit. The terminals of 43 will at that time be closed, but the terminals of 40, 41 and 48 will be open, while the switch 50 will be in the upper position to connect the time clock 45 with the line 47 but the timer or clock circuit will then be open.

The alarm switch 40 may be in a suitable location outside of the enclosure V, FIG. 1, and indeed there may be a number of spaced switches in parallel, which may be closed by the attendant at the protected location in the event of a robbery or burglary or other contingency. Operation of the switch 40 will start the operation of the system.

The direct current from the battery will pass from 28 to 40 to 26a to 43 to 42 to 27 and then to the battery; all when the terminals of 40 and 43 are closed. The relay 42 will then be energized, FIG. 3. The relay closing switch 51 will close 41 and hold the circuit closed, irrespective of whether the switch 40 is released; the circuit remaining closed during the operation of a cycle. The closing of switch contacts 52 will connect the terminals 48 to 47 and 50, solid lines, so as to start the clock motor 45 and the message-producing operating motor 44, which motors are now in parallel across the alternating current lines 3 and 4. The closing of switch contacts 53 will also close the terminals 34 to the secondary 105, FIG. 7, so that the transmitter will be activated to transmit the signal.

At the beginning of a cycle, the cam 70, FIGS. 4 and 5 will be at the right from the position shown so that it is out of contact with a cross-piece 71, but the contacts 76 will be closed to close the terminals 43 to the relay 42. At that time, the contacts 75 will be open so that the terminals 32 to the lamp 31 will be open so that the lamp will not show lit. As the cam 70 moves along clockwise, FIG. 4, which may be a period of one minute, it will, at the end of its movement, engage the cross-piece 71 so as to open the contacts 76 and terminals 43, thus deenergizing the relay 42 while the contacts 75 and terminals 32 will be closed to flash the lamp 31 indicating the completion of the cycle. The deenergizing of the relay 42 will open the terminals 34, 41 and 48 so as to open the transformer secondary 105, FIG. 7, to disconnect the transmitter, open the alarm circuit at 41, switch 40 having been released, and open the circuits of the clock motor 45 and of the driving motor 44 for the message-producing means.

The completion of the cycle leaves the terminals 43 to the relay 42 open. It is to close 43 that a reset button, FIG. 6, is provided. (Here visualize contact 50 as shown in FIG. 1.) The push button 78 is moved to connect contact 50 to the right contact 79, FIG. 6, lower contact FIG. 1, in order to close the circuit by 4, 49, 50, 46 and 3 through the clock motor 45, the position of the part 50 being at its lower position, FIG. 1. That causes the motor to move cam 70, FIG. 4, so as to permit contacts 76 to close in order to close the terminals 43, FIG. 5, to the relay 42, which latter, FIG. 3, causes switches 51, 52 and 53 to close terminals 41, 48 and 34 to the holding switch 41, the motor 44 to the message producing means 9 and the transmitter 6. The push button need only be momentarily operated and can then be released; the time of release is brought about by the fact that the cam 70 moves away from cross-piece 71 causing the switch contact 75 to open so as to open 32 and extinguishing the lamp 31, thereby telling the attendant that the button should be released. The system is then in condition for another cycle by operation of the switch 40.

Specifically the alarm switch 40, FIG. 1, closes the circuits to the relay 42 causing closing of the switching means 52, 53, 51, respectively, FIG. 1, to the timer 45 and the motor 44 driving the message-producing means 9, the transmitter 6 and the holding switch 41, while later the timer 45 by the contacts 75 and 76, FIG. 5, closes the circuit to the lamp 31 and opens the circuit to the relay 42. However, generally stated the electrically operated timer 45, FIGS. 1 and 5, is connected to control the operation of the switching means 53, 52, 51, which latter are connected to close and open the circuits from the terminals to the transmitter 6, the motor 44 and the holding switch 41. Accordingly the timer operates upon closing of the alarm switch to control and cause the switching means to close the circuits of the transmitter and of the motor for the message-producing means for a period sufficient to effect sending of the message and also to signal to the attendant that the message has been sent.

An alternative to FIG. 4 is shown in FIG. 8 in connection with FIG. 4. In FIG. 8 the cam 70 is loose on the shaft 69 of the time motor 45, and that shaft has fixed thereto an arm 110 normally held against a stop 111 by a spring 112 bearing against a lug 113 on the cam. Upon completion of the cycle initiated by the switch 40, the cam will be positioned as shown in FIGS. 4 and 8. At that time the spring 112 will be compressed with the arm away from the stop 111. When now the timer stops at the completion of the cycle, the arm 110 will stop. After therefore the cam 70 is in the position shown in FIGS. 4 and 8, causing contacts 76 to open and opening terminals 43 to complete the cycle, the spring 112 will continue to move the cam 70 clockwise away from 71 so as to again close 43 but open 32. The spring 112 is of sufficient strength to depress 71 against the tension of spring 74, FIG. 4. That operation will place the system in condition with 43 closed so that the system is again ready for operation upon closing of the switch 40.

As previously described, while the system is connected to the outside source 1, 2 the converter operating as a rectifier, will pass a trickle charge into the battery 26, the converter being so proportioned with reference to the battery that as soon as the voltage of the battery equals that of the converter, there will be no further charging. Actually a 12 volt battery may be employed for this purpose, because the alternating current traversing the primary 80 is transformed to a low voltage so that the rectified low voltage alternating current will charge the battery.

If, for any reason, the outside source of alternating current should fail, then the converter will immediately go into operation to produce and apply to the conductors 3 and 4 within the protected location an alternating current of 120 volts at 60 cycles. There will, therefore, be no interruption of the system at all.

The entire system may be placed in an enclosed protected location viz., a vault of a suitable material and shown diagrammatically at V, FIG. 1; and such enclosure is so constructed and arranged that the essential elements of the entire system are enclosed and protected against access thereto and against tampering therewith so that those essential elements cannot be tampered with by a burglar or robber. FIG. 1, shown diagrammatically the alarm switch 40 as below and outside of the enclosure V so that it will be accessible for operation from outside of the enclosure. However, the terminals 41 of the holding switch and its actuating relay 42, FIG. 3, are both within the enclosure V so that they are enclosed and protected against access thereto and tampering therewith by a burglar. In FIG. 1 the resetting switch contact is shown diagrammatically and in FIG. 6 partly in section. Actually the contact switch 50 will be located below the top of the enclosure V while its actuating buttton 78, FIG. 6, will extend through the top of the enclosure (as to the left of 65, FIG. 6) and accessible for operation from outside of the enclosure. The contact 50, its cooperating contacts 79 and their connections to 47 and 49 are however located within the enclosure V and are protected against access thereto and against tampering therewith by a burglar. Thus the essential elements of the burglar alarm, viz., the terminals 1, 2, 13 and 14 and the relay 15 with its switches 16 and 17, FIG. 2, the transmitter 6 and its terminals 34, the message producing means 9, 10 and its motor 44, the switching means 52, 53 to the terminals 48 and 34, and its operating relay 42, FIG. 3, the timer 43 and its switches 75 and 76, FIGS. 4 and 5, to the terminals 32 and 43 of the lamp 31 and of the relay 42, the holding switch 51 and the terminals 41, the resetting switch 50 and the contacts 79, FIG. 6, the lamps 29 and 31, the battery 26, the transformer primary winding 80 and the secondary windings 82, 87 and associated elements forming a rectifier and a converter, and all connections are within the enclosure V. That enclosure is so constructed and arranged as to protect those essential elements against access thereto and against tampering therewith by a burglar. The only parts exposed to the attendant are the alarm switch 40 and the reset button 78. The lamps 29 and 31 may be viewed through holes in the top of the vault V as usual in electrical apparatus; for the connection from the lamps are to the conductors or terminals 1, 2 and 3 and 4 so that the breaking of the lamps and their connections by a burglar will not disturb the essential parts of the warning system. The entire system is, however, ready for operation at all times.

The alarm switch 40 and the button 78 of the resetting switch 50 are of course outside of the enclosure or vault V so as to be accessible to the attendant (or switch 40 operable by the burglar opening a window or door as explained below), and switch 40 is therefore shown in FIG. 1 below the enclosure or vault V. Since the alarm switch 40 will be closed by the attendant as soon as warned by the burglar (or by the burglar opening or closing a window or a door), the warning system instantly goes into operation. Even the destruction of the switch 40 thereafter will not stop such operation; for the holding switch 41 inside of the enclosure or vault V will instantly close the circuits While the button 78 of the resetting switch 50 is outside of the enclosure or vault, it can be closed one minute after the timer 45 has completed the cycle indicated, first by the flashing of the lamp 31 during the one minute cycle and second by the extinguishing of the lamp at the end of the minute. That gives the attendant one minute after being warned by the burglar; and again after operating the resetting switch, the holding switch 41 within the enclosure or vault again instantly goes into operation and cannot be stopped by the burglar.

As previously described, the battery is kept fully charged by a trickle charge, and upon failure of the outside alternatnig current, the system remains in operation. Moreover, by applying a low voltage continuously to the filaments of the cathode tubes, they are always ready for immediate operation. The system is simple in operation, and construction, and is effective in its action and is not liable to get out of repair.

The above described system provides an effective and convenient means for transmitting a message from a protected location by radio to a distant receiver. The apparatus is protected so that it cannot be tampered with. The converter within the enclosure is so constructed that upon failure of the outside source (which may be cut by a burglar), the converter goes into action practically instantly.

The feature of always keeping the filament 102 of the cathode warm by the current from secondary 101 is desirable where a cathode tube is employed. As soon as the alarm switch 40 is closed, the signal will be sent practically instantaneously, so that the burgler will not be able to get away before the police have been notified.

While in the embodiment described the system is started by a manually or pedally operated switch, other means may be provided to start the system. Thus the switch 40 may be placed adjacent a window or a door which when opened or disturbed will cause the switch to close.

The switch 40 may also be operated by a device actuated upon interruption of a ray traversed by a burglar. The switch 40 may moreover be closed by a thermostat in case of a fire in the protected location which may then notify the nearest fire station by radio. Various other means and uses will be suggested by those skilled in the art.

Having thus described the invention, what is claimed and desired to be secured by Letters Patent is:

1. A system for transmitting a message from an enclosed protected location by radio to a distant receiver, comprising, an enclosure in which are enclosed and protected a transmitter and means adapted to produce and deliver a message to said transmitter, a source of current having terminals within said enclosure, a motor within said enclosure and adapted to drive said message-producing means, switching means within said enclosure and connected to close and open the circuits from said terminals to said transmitter and to said motor, an electrically operated timer within said enclosure and connected to control the operation of said switching means, said enclosure being so constructed and arranged as to enclose and protect said source of current and its terminals, said transmitter, said message producing means, said motor, said switching means, said timer, and their connections against access to and against tampering therewith by a burglar from outside of said enclosure, and an alarm switch accessible for operation from outside of said enclosure and connected to close the circuits of said switching means and of said timer, said timer operating upon closing of said alarm switch to cause said switching means to close the circuits of said transmitter and of said motor for a period sufficient to effect sending of the message, said timer operating at the termination of such period to open the circuits of said transmitter and of said motor.

2. A system for transmitting a message from an enclosed protected location by radio to a distant receiver, comprising, an enclosure in which are enclosed and protected a transmitter and means adapted to produce and deliver a message to said transmitter, a source of current having terminals within said enclosure, a motor within said enclosure and adapted to drive said message-producing means, a holding switch within said enclosure, switching means within said enclosure and connected to close and open the circuits from said terminals to said transmitter, to said holding switch and to said motor, an electrically operated timer within said enclosure and connected to control the operation of said switching means, said enclosure being so constructed and arranged as to enclose and protect said source of current and its terminals, said transmitter, said message producing means, said motor, said switching means, said timer, said holding switch, and their connections against access to and against tampering therewith by a burglar from outside of said enclosure, and an alarm switch accessible for operation from outside of said enclosure and connected in parallel with said holding switch and connected to close the circuits of said switching means and of said timer, said timer operating upon closing of said alarm switch to cause said switching means to close the circuits of said transmitter, of said motor and of said holding switch for a period sufficient to effect sending of the message, said timer operating at the termination of such period to open the circuits of said transmitter and of said motor.

3. A system for transmitting a message from an enclosed protected location by radio to a distant receiver, comprising, an enclosure in which are enclosed and protected a transmitter and means adapted to produce and deliver a message to said transmitter, a source of current having terminals within said enclosure, a motor within said enclosure and adapted to drive said message-producing means, switching means within said enclosure and connected to close and open the circuits from said terminals to said transmitter and to said motor, an electrically operated timer within said enclosure and connected to control the operation of said switching means, said enclosure being so constructed and arranged as to enclose and protect said source of current and its terminals, said transmitter, said message producing means, said motor, said switching means, said timer, and their connections, against access to and against tampering therewith by a burglar from outside of said enclosure, and an alarm switch accessible for operation from outside of said enclosure and connected to close the circuit of said switching means and of said timer, said timer operating upon closing of said alarm switch to cause said switching means to close the circuits of said transmitter and of said motor for a period sufficient to effect sending of the message and to thereafter open said switching means, and a resetting switch operable thereafter and connected to close the circuit to said timer in order to repeat the operation.

4. A system for transmitting a message from an enclosed protected location by radio to a distant receiver, comprising, an enclosure in which are enclosed and protected a transmitter and means adapted to produce and deliver a message to said transmitter, a source of current having terminals within said enclosure, a motor within said enclosure and adapted to drive said message-producing means, a lamp within said enclosure and adapted for connection to said terminals, switching means within said enclosure and connected to close and open the circuits from said terminals to said transmitter and to said motor, an electrically operated timer within said enclosure and connected to control the operation of said switching means and of said lamp, said enclosure being so constructed and arranged as to enclose and protect said source of current and its terminals, said transmitter, said message producing means, said motor, said switching means, said timer, said lamp, and their connections, against access to and against tampering therewith by a burglar from outside of said enclosure, and an alarm switch accessible for operation from outside of said enclosure and connected to close the circuits of said switching means and of said timer, said timer operating upon closing of said alarm switch to cause said switching means to close the circuits of said transmitter and of said motor for a period sufficient to effect sending of the message, said timer operating at the termination of such period to open the circuits of said transmitter and of said motor and to close the circuit to said lamp in order to show the completion of the sending of the message.

5. A system for transmitting a message from an enclosed protected location by radio to a distant receiver, comprising, an enclosure in which are enclosed and protected a transmitter and means adapted to produce and deliver a message to said transmitter, a source of current having terminals within said enclosure, a motor within said enclosure and adapted to drive said message-producing means, switching means within said enclosure and connected to close and open the circuits from said terminals to said transmitter and to said motor, a relay within said enclosure and adapted to operate said switching means, an electrically operated timer within said enclosure and connected to control the operation of said relay, said enclosure being so constructed and arranged as to enclose and protect said source of current and its terminals, said transmitter, said message producing means, said relay, said motor, said switching means, said timer and their connections, against access to and against tampering therewith by a burglar from outside of said enclosure, and an alarm switch accessible for operation from outside of said enclosure and connected to close the circuit of said relay adapted to cause said switching means to close the circuits of said transmitter, of said motor and of said timer, said timer operating to open the circuit of said relay after a period sufficient to effect sending of the message.

6. A system for transmitting a message from an enclosed protected location by radio to a distant receiver, comprising, an enclosure in which are enclosed and protected a transmitter and means adapted to produce and deliver a message to said transmitter, an outside source of alternating current having terminals within said enclosure, a battery within said enclosure, a transformer within said enclosure and having a primary winding connected to said terminals and having a secondary winding, a rectifier within said enclosure and connecting said secondary winding to said battery, a motor within said enclosure and adapted to drive said message-producing means, switching means within said enclosure and connected to close and open the circuits from said terminals to said transmitter and said motor, a relay within said enclosure connected to said battery and adapted to operate said switching means, an electrically operated timer within said enclosure and connected to control the operation of said relay, said enclosure being so constructed and arranged as to enclose and protect said terminals, said transmitter, said message producing means, said transformer and its windings, said rectifier, said battery, said motor, said switching means, said relay, said timer, and their connections, against access to and against tampering therewith by a burglar from outside of said enclosure, and an alarm switch accessible for operation from outside of said enclosure and connected to close the circuits of said switching means and of said timer, said timer operating upon closing of said alarm switch to cause said switching means to close the circuits of said transmitter and of said motor for a period sufficient to effect the sending of the message, said timer operating at the termination of such period to open the circuits of said transmitter and of said motor.

7. A system for transmitting a message from an enclosed protected location by radio to a distant receiver, comprising, an enclosure in which are enclosed and protected a transmitter and means adapted to produce and deliver a message to said transmitter, an outside source of alternating current having terminals within said enclosure, a battery within said enclosure, a converter within said enclosure and connected with said terminals and in circuit with said battery, said converter being constructed to normally deliver a direct current to said battery and adapted upon failure of said outside source to deliver current to said terminals, a motor within said enclosure and adapted to drive said message-producing means, switching means within said enclosure and connected to close and open the circuits from said terminals to said transmitter and said motor, an electrically operated timer within said enclosure and connected to control the operation of said switching means, said enclosure being so constructed and arranged as to enclose and protect said terminals, said transmitter, said message producing means, said battery, said converter, said motor, said switching means, said timer, and their connections, against access to and against tampering therewith by a burglar from outside of said enclosure, and an alarm switch accessible for operation from outside of said enclosure and connected to close the circuits of said switching means and of said timer, said timer operating upon closing of said alarm switch to cause said switching means to close the circuits of said transmitter and of said motor for a period sufficient to effect sending of the message, said timer operating at the termination of such period to open the circuits of said transmitter and of said motor.

References Cited in the file of this patent

UNITED STATES PATENTS

| | | |
|---|---|---|
| 1,927,690 | Miller | Sept. 19, 1933 |
| 2,250,834 | Howton | July 29, 1941 |
| 2,340,621 | Seifert | Feb. 1, 1944 |
| 2,522,615 | Hughes | Sept. 19, 1950 |
| 2,868,996 | McCord | Jan. 13, 1959 |
| 2,937,269 | Miller | May 17, 1960 |